United States Patent [19]

Hares

[11] 4,195,848

[45] Apr. 1, 1980

[54] SPINDLE ADAPTORS

[75] Inventor: Barrington Hares, Great Barr, England

[73] Assignee: BSR Limited, Cradley Heath, England

[21] Appl. No.: 868,496

[22] Filed: Jan. 11, 1978

[30] Foreign Application Priority Data

Jan. 11, 1977 [GB] United Kingdom ............... 841/77

[51] Int. Cl.$^2$ ............................................. G11B 17/04
[52] U.S. Cl. ................................................ 274/10 S
[58] Field of Search ................................... 274/10 S

[56] References Cited

U.S. PATENT DOCUMENTS

| 3,712,630 | 1/1973 | Tajime | 274/10 S |
| 3,814,440 | 6/1974 | Aisumi | 274/10 S |
| 3,869,130 | 3/1975 | Igata | 274/10 S |

*Primary Examiner*—Steven L. Stephan
*Attorney, Agent, or Firm*—Spencer & Kaye

[57] ABSTRACT

A spindle adaptor for use with an umbrella center spindle record player said adaptor comprising a spindle adapted, at its lower end, to be received in the normal smaller diameter spindle receiving means of the record player and carrying at its upper end a body member having a record supporting means movable between an extended position to support a stack of large center hole records and a retracted position allowing the lowermost, or the last, record of the stack to descend along the body and a record retaining means movable between an extended position temporarily to support the remainder of the stack of the large center hole records when the support means is in its retracted position and a retracted position to permit free passage of said records along the body and a control member within the spindle and movable to cause movement of the record retaining means and the record supporting means between said extended and retracted positions.

8 Claims, 2 Drawing Figures

SPINDLE ADAPTORS

BACKGROUND OF THE INVENTION

FIELD OF THE INVENTION

This invention relates to a spindle adaptor for use with umbrella centre spindle record players.

Umbrella centre spindle record players comprise a deck plate, a turntable rotatably mounted on the deck plate, a centre spindle extending upwardly from the centre of the turntable to support a stack of records above the turntable, the centre spindle including an elongate body projecting upwardly from the centre of the turntable and having a record supporting means movable to an extended position to support a stack of records and a retracted position allowing the lowermost, or the last, record of the stack to descend along the spindle and a record retaining means movable between an extended position temporarily to support the remainder of the stack during descent of the lowermost record thereon and a retracted position to permit free passage of records along the spindle and a control member movable within the spindle to cause said movement of the record supporting and retaining means whereby records may be caused to be fed singly in succession from the bottom of the stack onto the turntable.

Usually the record supporting means comprises a plurality of record supporting arms and the record retaining means a plurality of record retaining fingers and, for example, the record supporting means may comprise three record supporting fingers and the record retaining means three record retaining fingers, the fingers being equiangularly spaced around the spindle body.

Such umbrella centre spindle record players are intended for use with a stack of records having a small central hole, conventionally of 9/32" diameter, and records intended to be played at 78 rpm or 33⅓ rpm are conventionally provided with such a centre hole. There are also produced records intended to be played at 45 rpm and such records are provided with a larger diameter centre hole of about 1½" diameter. To permit the use of a record player with both large and small hole records spindle adaptors have hitherto been provided to be engaged over the smaller diameter spindle or to replace the smaller diameter spindle.

SUMMARY OF THE INVENTION

It is an object of the present invention to provide a new and improved spindle adaptor for use with an umbrella centre spindle record player.

According to the present invention we provide a spindle adaptor for use with an umbrella centre spindle record player said adaptor comprising a spindle adapted, at its lower end, to be received in the normal small diameter spindle receiving means of the record player and carrying at its upper end a body member having a record supporting means movable between an extended position to support a stack of large centre hole records and a retracted position allowing the lowermost, or the last, record of the stack to descend along the body and a record retaining means movable between an extended position temporarily to support the remainder of the stack of the large centre hole records when the support means is in its retracted position and a retracted position to permit free passage of said records along the body and a control member within the spindle and movable to cause movement of the record retaining means and the record supporting means between said extended and retracted positions.

The control member may be adapted to slide axially relative to the body and be provided with a cam means adapted to engage said means to move them between their extended and retracted positions.

The cam means may comprise a first cam member adapted to engage the record supporting means.

The second cam member may be fixed relative to the control member and the first cam member axially slidable thereon and resiliently biased normally in the direction towards the second cam member, the second cam member being spaced closer to the turntable than the first cam member.

Each cam member may be of generally frusto-conical configuration and the means may be formed with inclined portions of corresponding configuration to the cam members by which they are engaged.

The record supporting means may comprise a first pair of diametrically opposed fingers mounted for sliding movement in a diametric plane of the body and the record retaining means may comprise a second pair of diametrically opposed fingers also mounted for sliding movement in a diametric plane of the body.

A resilient biasing means may be provided to act between the record supporting and retaining fingers whereby the supporting fingers are normally biased to their extended position and the retaining fingers to their retracted position.

The first cam member may engage each record retaining finger at a location on the finger positioned on the same side of the central axis of the adaptor as the operative end portion of the finger whilst the second cam member may engage each record supporting finger at a location on the finger spaced on the opposite side of the central axis of the adaptor to the operative end part of the finger whereby downward movement of the first cam member causes outward movement of the record retaining fingers whilst downward movement of the second cam member causes inward movement of the record supporting fingers.

The adaptor body may be formed in two portions a first portion provided with a track for said fingers and an upper cover portion, there being a metal reinforcing plate located at the junction between the first and second parts and provided with apertures through which fastener elements are passed to secure the parts of the body together.

At its lower end the body may be provided with a rotatable skirt adapted to engage and rotate with the turntable.

BRIEF DESCRIPTION OF THE DRAWINGS

The invention will now be described in more detail by way of example with reference to the accompanying drawings wherein.

DESCRIPTION OF THE PREFERRED EMBODIMENT

Figure 1:
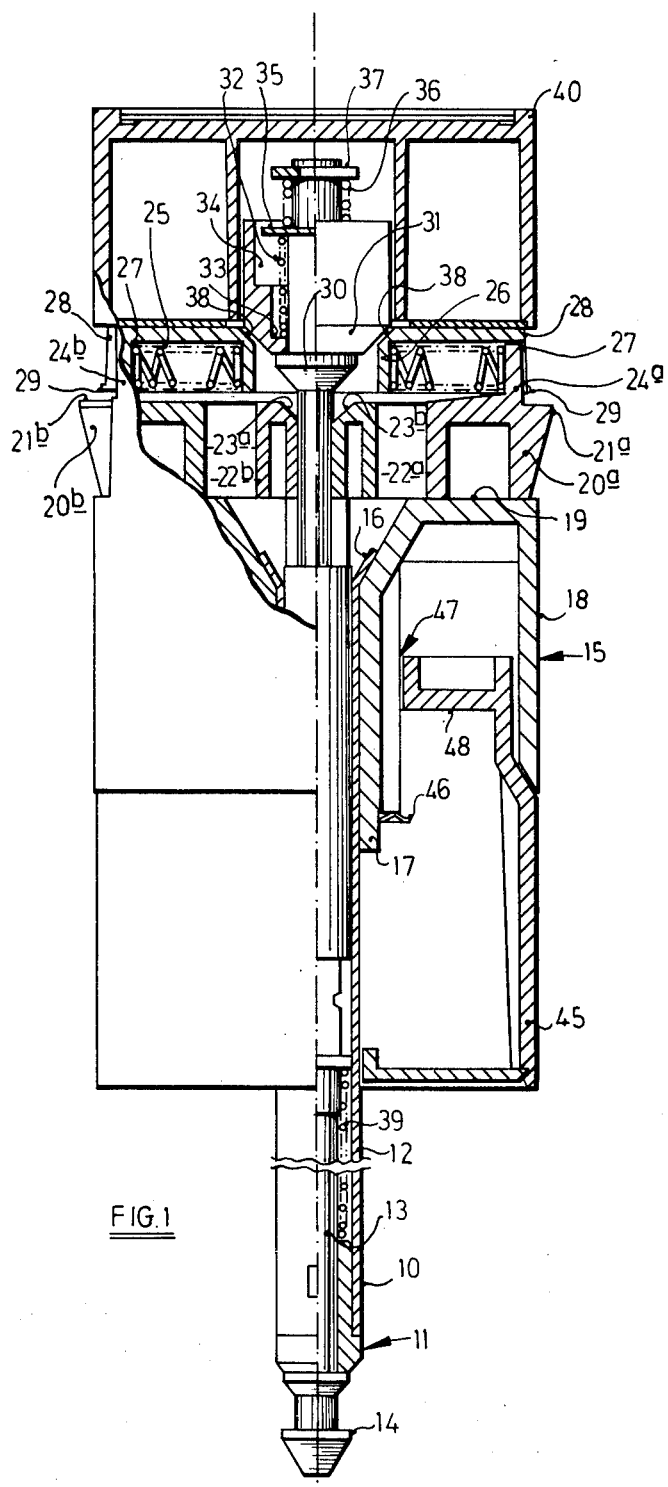
FIG. 1 is a side elevation, partly in section, of a spindle adaptor embodying the invention.
Figure 2:
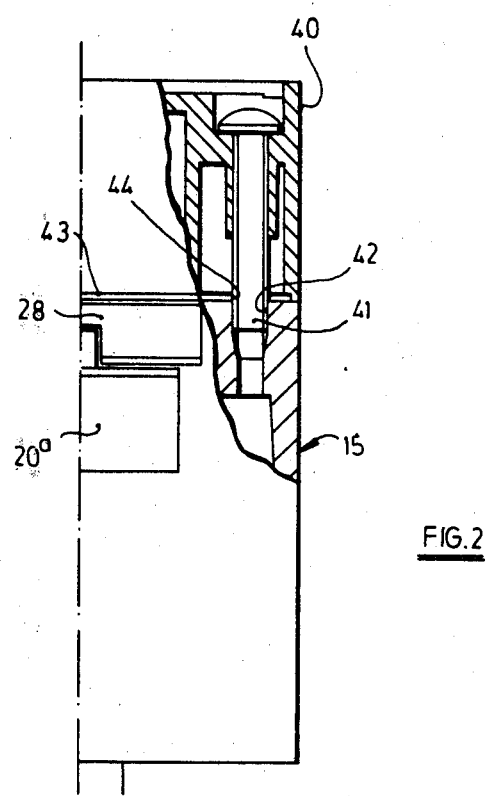
FIG. 2 is a scrap section of the adaptor of FIG. 1 taken on a section line at right angles to the section line of FIG. 1.

Referring to the drawings a spindle adaptor comprises an elongate spindle 10 adapted at its lower end 11 to be received within the normal small spindle receiving means of a conventional umbrella centre spindle record player. The spindle 10 comprises an outer tubular part 12 within which a control member 13 is axially slidably mounted and is provided with the conventional tapered shoulder formation 14 at its lower end for engagement with the record changing mechanism of the record player. This mechanism of the record player is adapted, in the conventional small diameter spindle, to cause lowering of a record onto the turntable as the result of downward movement of a control member similar to the control member 13 and, in addition, as a result of increased resistance to movement downwardly of the control member when a record remains supported on the spindle compared with a greater permitted downward movement of the control member when no record is supported on the spindle, to cause automatic switch off of the record player at the end of playing of a stack of records.

At its upper end the spindle 10 carries an adaptor body 15 which is made as a moulding in a suitable synthetic plastics material and is staked, as indicated at 16, to the upper end of the tubular part 12. The body 15 is of hollow construction having an inner tubular part 17 to receive the tubular part 12 and an outer cylindrical part 18 of a diameter slightly smaller than the large diameter central aperture of a record.

Slidably mounted on a horizontal track 19 of the body part 15 are a pair of record supporting fingers 20a, 20b. The fingers 20a, 20b, are thus supported for diametrically opposed movement in a diametric plane of the body 15. The fingers 20a, 20b, have an outer record supporting part 21a, 21b, which is connected by a radially inwardly extending part 22a, 22b to a cam engaging portion 23a, 23b. It will be noted that the portion 23a, fixed to the fingers 20a is on the opposite side of the axis of the adaptor to the portion 21a thereof and similarly in the case of the finger 20b. The fingers 20a, and 20b are identical and the parts 22a and 22b thereof extend from the part 21a spaced from the central axis of the finger so as to pass on opposite sides of the control member 13 whilst the parts 23a and 23b extend at right angles to the parts 22a and 22b.

Each finger 20a, 20b, also carries a lug 24a, 24 b with which a coil compression spring 25 is engaged whilst the opposite end of the spring 25 engages an end wall 26 of a recess 27 formed in the underside of an associated record retaining finger 28. Each record retaining finger 28 has a record retaining portion 29 and, in use, the record retaining fingers 28 are normally biased inwardly to their retracted position, shown in FIG. 1, by the springs 25 whilst the record supporting fingers 20a and 20b are resiliently biased to their extended position.

Fixed to the control member 13 is a frusto-conical cam member 30 whilst a cam member 31, also of frusto-conical configuration is slidably mounted on the upper end of the control member and is resiliently biased into engagement with the cam member 30 by means of a coil compressing spring 32 engaged between an end surface 33 of a counterbore 34 in the cam member and a washer 35 mounted on the upper end of the control rod 13 and itself biased by a relatively strong coil compression spring 36 engaged with a circlip 37 mounted on the control rod 13.

A top closure cap 40 is provided for the upper end of the body and is held in place by a pair of screws 41 received in screw threaded apertures 42 in the body 15. A metal plate 43 is positioned between the cap 40 and body 15 and is provided with apertures 44 through which the screws 41 pass in order to reinforce the body and prevent any lateral distortion thereof on tightening of the screws 42.

A rotatable skirt 45 is rotatably and axially slidably mounted on the adaptor for engagement with the turntable of the record player with which the adaptor is to be used so as to rotate therewith. The skirt 45 is held in positon by means of a retaining ring 46 engaged with the lower end of the tubular part 17 of the body 15 and a suitable bearing means indicated generally at 47 is provided between the upper end of the skirt 45 and the tubular part 17 of the body. As a result of the axial movement permitted between the position shown in FIG. 1 and the lower position in which the undersurface 48 is in engagement with the retaining ring 46 the adaptor may be used with different record players irrespective of any difference in one record player as compared with another in the distance between the upper surface of the turntable and the normal socket or receiving means of the lower end of the spindle 10.

In use, when a stack of records are supported on the record supporting fingers 20a and the mechanism of the record player moves the control member 13 downwardly then the first cam member 31 is moved into engagement with a part 38 of the record retaining fingers 28 initially cause them to be moved outwardly until they engage the wall of the next to lowermost record of the stack with the record retaining parts 29 interposed between the lowermost and said next lowermost record. Further downward movement of the first cam member 31 is then prevented whilst continued downward movement of the control rod 13 and hence of the second cam member 30 is permitted by virtue of compression of the coil compression spring 32 so that the second cam member 30 engages the parts 23a and 23b of the record supporting fingers 20a and 20b to cause the fingers to be moved inwardly thus permitting the lowermost record of the stack to be lowered onto the turntable whilst the remainder of the stack is supported on the record retaining means of the record retaining fingers 28.

When the record player mechanism permits the control member 13 to move upwardly under the bias of a coil compression spring 39 the first and second cam members are returned to the positions shown in FIG. 1 thus permitting the record retaining fingers and record supporting fingers to return to the positons shown whereby the stack of records will be supported on the record supporting parts 21a and 21b of the record supporting fingers 20a and 20b.

In the case where only a single record is supported on the record supporting means 21a and 21b then on downward movement of the first cam member 31 the record retaining fingers 27 will be moved sufficiently outwardly to permit the cam member 31 to move downwardly through the thus formed gap between the record retaining fingers thus permitting the control member 14 to move further downwardly thereby signalling to the mechanism of the record player that no further records remain to be played whereby the mechanism causes the record player to switch off at the end of the next cycle in conventional manner. As in the case previously described continued downward movement of the control member 13 causes the second cam member 30 to engage the parts 23a and 23b to move the record supporting fingers inwardly thereby dropping the record onto the turntable.

It will be appreciated that by virtue of the hereinbefore described spindle adaptor a conventional umbrella centre spindle record player having a small diameter centre spindle can be easily converted for use with a large centre hole records merely by removing the conventional small diameter spindle and inserting the adaptor embodying the invention.

I claim:

1. A spindle adaptor for a record player comprising a spindle adapted at its lower end to be received in a spindle receiving means of a record player, a body member carried at the upper end of the spindle, record supporting means mounted in the body member for movement between an extended position in which said means extend outwardly of the body to support a stack of large centre hole records and a retracted position to allow a record to descend along the body, record retaining means mounted in the body member for movement between an extended position in which said means extend outwardly of the body temporarily to support a remainder of the stack of large centre hole records when the support means is in its retracted position and a retracted position to permit free passage of said records along the body, a control member movable longitudinally within the spindle, a first cam member mounted on the control member within the body and axially slidable relative to the control member, a second cam member fixedly mounted on the control member within the body, means normally to resiliently bias the first cam member in a direction towards the lower end of the spindle, means for maintaining said record retaining means in abutting relationship with said first cam member and for moving said record retaining means between said extended and retracted positions as a function of movement of the first cam member and means for maintaining said record supporting means in abutting relationship with said second cam member and for moving said record supporting means between said extended and retracted positions as a function of movement of the second cam member.

2. An adaptor according to claim 1 wherein, the second cam member is closer to said lower end of the spindle than is the first cam member.

3. An adaptor according to claim 1 wherein each cam member is of generally frusto-conical configuration, the record retaining means and the record supporting means being formed with inclined portions of corresponding configuration to the cam members by which they are engaged.

4. An adaptor according to claim 1 wherein the record supporting means comprises a first pair of diametrically opposed fingers mounted for sliding movement in a diametric plane of the body and the record retaining means comprises a second pair of diametrically opposed fingers also mounted for sliding movement in a diametric plane of the body.

5. An adaptor according to claim 4 wherein a resilient biasing means is provided to act between the record supporting fingers whereby the supporting fingers are normally biased to their extended position and the retaining fingers to their retracted position.

6. An adaptor according to claim 4 wherein the first cam member engages each record retaining finger at a location on the finger positioned on the same side of the central axis of the adaptor as the operative end portion of the finger whilst the second cam member engages each record supporting finger at a location on the finger spaced on the opposite side of the central axis of the adaptor to the operative end part of the finger whereby downward movement of the first cam member causes outward movement of the record retaining fingers whilst downward movement of the second cam member causes inward movement of the record supporting fingers.

7. An adaptor according to claim 1 wherein the adaptor body is formed in two portions a first portion, provided with a track for said fingers, and an upper cover portion there being a metal reinforcing plate located at the junction between the first and second parts and provided with apertures through which fastener elements are passed to secure the parts of the body together.

8. An adaptor according to claim 1 wherein at its lower end the body is provided with a rotatable skirt adapted to engage and rotate with the turntable.

* * * * *